(No Model.)

G. BINDER.
LUBRICATOR.

No. 529,473. Patented Nov. 20, 1894.

Witnesses:
Thomas M. Smith
Richard C. Maxwell

Inventor.
Gottlob Binder,
By J. Walter Douglass,
Attorney.

THE NORRIS PETERS CO., PHOTO-LITHO., WASHINGTON, D. C.

United States Patent Office.

GOTTLOB BINDER, OF PHILADELPHIA, PENNSYLVANIA.

LUBRICATOR.

SPECIFICATION forming part of Letters Patent No. 529,473, dated November 20, 1894.

Application filed May 21, 1894. Serial No. 512,033. (No model.)

*To all whom it may concern:*

Be it known that I, GOTTLOB BINDER, a citizen of the United States, residing at the city of Philadelphia, in the county of Philadelphia and State of Pennsylvania, have invented certain new and useful Improvements in Loose-Pulley Oilers, of which the following is a specification.

My invention relates to an oiler or lubricator for employment with loose pulleys or the like; and in such connection it relates more particularly to the construction and arrangement thereof.

The principal objects of my invention are, first, to provide a cheap, durable and effective oiler or lubricator for loose pulleys or other similar devices or appliances and in which the oil is lifted by centrifugal force and under regulation conducted to an exit nozzle and supplied to the part to be lubricated; second, to provide a loose pulley lubricator in which the members thereof are easily assembled and readily detached for supplying lubricant to the reservoir thereof; and third, to provide a lubricator with a reservoir and a central tube with an inlet and a plug stem with a handle and an integral threaded end or nipple detachably engaging the threaded surface of a socket or bearing merging with an integral threaded nozzle, the construction and arrangement being such that by centrifugal force the lubricant is lifted and conducted through said tube to the nozzle and discharged therethrough onto a loose pulley or appliance to be lubricated and the operative parts of the device so arranged as to be readily secured to position and disengaged for permitting of the refilling of the reservoir of the oiler as well as repairs to or the cleaning of the same.

My invention stated in general terms, consists of a loose pulley oiler or lubricator constructed and arranged in substantially the manner hereinafter described and claimed.

The nature and scope of my invention will be more fully understood from the following description taken in connection with the accompanying drawings forming part hereof, and in which—

Figure 1:
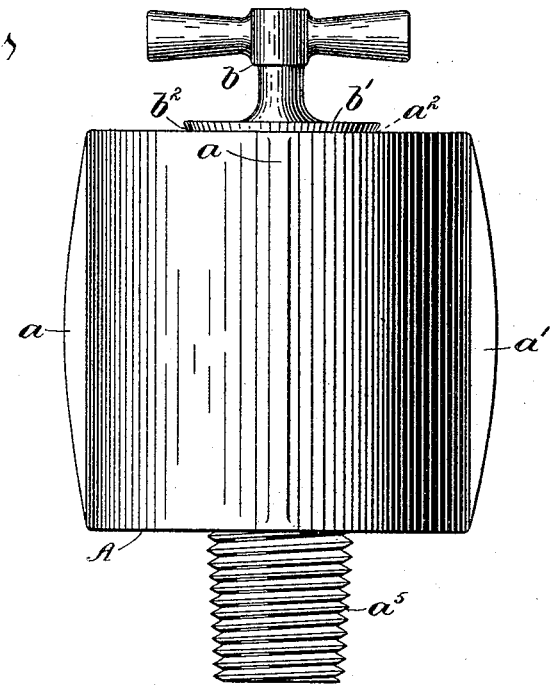
Figure 2:
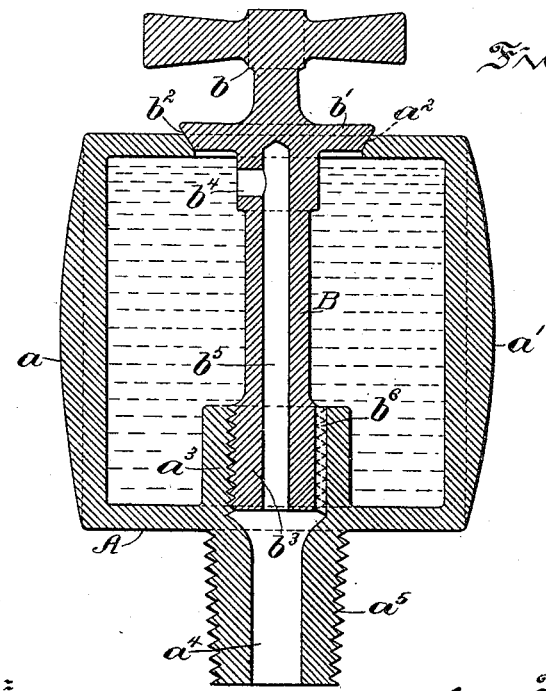

Figure 1, is an elevational view of an oiler embodying features of my invention; and Fig. 2, is a vertical central section through the device, showing the detail construction and arrangement of the assembled parts thereof.

Referring to the drawings A, is the casing or shell of the reservoir for the reception of oil or other suitable lubricant and provided with arched ribs $a$ and $a'$, projecting from the exterior surface or sides thereof, for the application of a wrench thereto in order to secure the device to the movable part of machinery to be lubricated by the same and also to permit of the ready detachment of the device, as requirements demand.

$a^2$, is an opening in the top of the shell or casing for the reception of a plug cap adapted to seat therewith in a manner to be more fully explained.

$a^3$, is a threaded socket bearing formed integral with the bottom of said shell and extending into the interior and merging into and with a contracted nozzle $a^4$, having a threaded exterior surface $a^5$, in order to permit of the securing of the same into a pulley or other movable part of machinery to be lubricated by the device in the manipulations thereof.

B, is a hollow stem provided with a handle $b$, and a plug cap $b'$, with a tapering edge $b^2$, forming a seat which is adapted to fit snugly against the opening $a^2$, provided in the top of the shell or casing A, to receive the same and integral with the hollow stem B, at the lower portion thereof is provided a threaded nipple or end $b^3$, detachably engaging the internally threaded socket or bearing $a^3$, of the shell or casing A.

$b^6$, is a vertical slit formed in the threaded portion of the nipple or end $b^3$, for permitting of the admission of air into the interior of the oil reservoir of the device. In the upper part of the hollow stem B, below the plug cap $b'$, is an inlet $b^4$, directly communicating with the vertical channel $b^5$, of the stem B, and leading directly into the interior of the nozzle $a^4$, projecting downward from the shell or casing A, of the device.

The oiler or lubricator hereinbefore described is adapted for use, as follows:—The reservoir is filled with a lubricant by loosening the stem B, the lower end of which is seated in the socket or bearing $a^3$, and at the same time the plug cap $b'$, is released from its engagement with the top of the shell A. The device being filled with oil or other lubricant the stem B, with the integral parts connected therewith are secured to their respective positions for example, as fully illustrated in Fig. 2, with the nozzle $a^4$, in engagement with the pulley or other movable part of machinery. In the movements of the pulley or part of machinery to which the lubricator is applied the oil of the reservoir will thereby be lifted and presented through the inlet $b^4$, to the vertical channel $b^5$, of the stem B, and flows in a downward direction to and through the nozzle $a^4$, onto the part to be lubricated. By reason of the location of the inlet in direct communication with the interior of the hollow stem B, the oil will by centrifugal force be presented thereto and conducted through the same under due regulation and supplied therefrom to the movable part of machinery during the rotation of the same to thereby keep such parts of machinery supplied with a lubricant so as to permit of perfect working thereof.

Having thus described the nature and objects of my invention, what I claim as new, and desire to secure by Letters Patent, is—

1. A lubricator, comprising a shell having an opening in the top and an internally threaded socket or bearing and an externally threaded depending nozzle, and a hollow stem with an inlet, tapering cap seat, handle and threaded nipple or end, substantially as and for the purposes set forth.

2. A lubricator, comprising a shell provided with exterior flaring ribs and having an opening in the top thereof and an internally threaded socket or bearing with an integral depending threaded nozzle and a hollow stem provided with an inlet, a handle with an integral plug-cap or seat with a tapering body and a threaded nipple or end with a vertical slit provided therein, substantially as and for the purposes set forth.

In testimony whereof I have hereunto set my signature in the presence of two subscribing witnesses.

GOTTLOB BINDER.

Witnesses:
THOMAS M. SMITH,
RICHARD C. MAXWELL.